United States Patent
Chung et al.

(10) Patent No.: US 8,042,114 B2
(45) Date of Patent: *Oct. 18, 2011

(54) RESOURCE ALLOCATION IN A NUMA ARCHITECTURE BASED ON SEPARATE APPLICATION SPECIFIED RESOURCE AND STRENGTH PREFERENCES FOR PROCESSOR AND MEMORY RESOURCES

(75) Inventors: Lynn Keat Chung, Rochester, MN (US); Chistopher Francois, Apple Valley, MN (US); Richard Karl Kirkman, Rochester, MN (US); Henry Joseph May, Mantorville, MN (US); Patrick Joseph McCarthy, Rochester, MN (US); Don Darrell Reed, Mantorville, MN (US); Kenneth Charles Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

This patent is subject to a terminal disclaimer.

(21) Appl. No.: 11/955,061

(22) Filed: Dec. 12, 2007

(65) Prior Publication Data

US 2008/0092138 A1    Apr. 17, 2008

Related U.S. Application Data

(63) Continuation of application No. 11/866,192, filed on Oct. 2, 2007, which is a continuation of application No. 10/403,150, filed on Mar. 31, 2003, now Pat. No. 7,334,230.

(51) Int. Cl.
   *G06F 9/46* (2006.01)
(52) U.S. Cl. .................................................. 718/104
(58) Field of Classification Search .................. None
   See application file for complete search history.

(56) References Cited

U.S. PATENT DOCUMENTS

| | | | |
|---|---|---|---|
| 5,745,778 | A | 4/1998 | Alfieri |
| 5,784,697 | A | 7/1998 | Funk et al. |
| 5,978,892 | A | 11/1999 | Noel et al. |
| 5,991,893 | A | 11/1999 | Snider |
| 6,154,823 | A | 11/2000 | Benayon et al. |
| 6,253,226 | B1 | 6/2001 | Chidambaran et al. |
| 6,353,898 | B1 | 3/2002 | Wipfel et al. |
| 2003/0018691 | A1 | 1/2003 | Bono |
| 2004/0221120 | A1 | 11/2004 | Abrashkevich et al. |

OTHER PUBLICATIONS

Microsoft Computer Dictionary, 5th Edition, 2002, Microsoft Press, pp. 249-250.

*Primary Examiner* — Meng An
*Assistant Examiner* — Eric Wai
(74) *Attorney, Agent, or Firm* — Wood, Herron & Evans, LLP (57) ABSTRACT

An apparatus, program product and method in which application program-specified resource allocation and allocation strength preferences are used to allocate hardware resources from a computer for that application program. The resource allocation preference is used to allocate hardware resources for the application program, while the allocation strength preference is used to determine whether to allocate alternate hardware resources when the resource allocation preference specified by the application program cannot be met.

13 Claims, 3 Drawing Sheets

RESOURCE ALLOCATION IN A NUMA ARCHITECTURE BASED ON SEPARATE APPLICATION SPECIFIED RESOURCE AND STRENGTH PREFERENCES FOR PROCESSOR AND MEMORY RESOURCES

CROSS-REFERENCE TO RELATED APPLICATIONS

This application is a continuation of U.S. patent application Ser. No. 11/866,192 filed on Oct. 2, 2007, by Lynn Keat Chung et al., which is a continuation of U.S. patent application Ser. No. 10/403,150, filed on Mar. 31, 2003 by Lynn Keat Chung et al., the entire disclosures of which are incorporated by reference herein.

FIELD OF THE INVENTION

The invention relates to computers and computer software, and in particular, to the allocation of hardware resources in a computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent execution entities defining independent paths of execution for a program. For example, for an e-commerce computer application, different threads might be assigned to different customers so that each customer's specific e-commerce transaction is handled in a separate thread. It will be appreciated that threads may be referred to in other computer architectures by terms such as tasks, processes, jobs, etc. As such, it should be understood that the term "thread" as used herein should be considered to be analogous to other types of execution entities used in other computer architectures, irrespective of what those other types of execution entities are called.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

A significant bottleneck that can occur in a multi-processor computer, however, is associated with the transfer of data to and from each microprocessor, often referred to as communication cost. Most computers rely on a main memory that serves as the principal working storage for the computer. Retrieving data from a main memory, and storing data back into a main memory, however, is often required to be performed at a significantly slower rate than the rate at which data is transferred internally within a microprocessor. Often, intermediate buffers known as caches are utilized to temporarily store data from a main memory when that data is being used by a microprocessor. These caches are often smaller in size, but significantly faster, than the main memory. Caches often take advantage of the temporal and spatial locality of data, and as a result, often significantly reduce the number of comparatively-slower main memory accesses occurring in a computer and decrease the overall communication cost experienced by the computer.

Often, all of the microprocessors in a computer will share the same main memory, an architecture that is often referred to as Symmetric Multiprocessing (SMP). One limitation of such computers, however, occurs as a result of the typical requirement that all communications between the microprocessors and the main memory occur over a common bus or interconnect. As the number of microprocessors in a computer increases, the communication traffic to the main memory becomes a bottleneck on system performance, irrespective of the use of intermediate caches.

To address this potential bottleneck, a number of computer designs rely on Non-Uniform Memory Access (NUMA), whereby multiple main memories are essentially distributed across a computer and physically grouped with sets of microprocessors and caches into physical subsystems or modules, also referred to herein as "nodes". The microprocessors, caches and memory in each node of a NUMA computer are typically mounted to the same circuit board or card to provide relatively high speed interaction between all of the components that are "local" to a node. The nodes are also coupled to one another over a network such as a system bus or a collection of point-to-point interconnects, thereby permitting microprocessors in one node to access data stored in another node, thus effectively extending the overall capacity of the computer. Memory access, however, is referred to as "non-uniform" since the access time for data stored in a local memory (i.e., a memory resident in the same node as a microprocessor) is often significantly shorter than for data stored in a remote memory (i.e., a memory resident in another node).

Irrespective of the particular type of multi-processing architecture used, efficient utilization of the hardware resources in a computer often requires a collaborative effort between software and hardware. As noted above, from a software standpoint, much of the work performed by a computer is handled by various threads. To ensure optimal performance, threads are typically assigned (e.g., at the time they are created) to subsets of available computer resources in such a manner that the workload of the computer is evenly distributed among the available computer resources.

For efficient utilization of microprocessors, for example, it is desirable to evenly distribute threads among the available microprocessors to balance the workload of each individual microprocessor, a process referred to as "symmetric" resource allocation. However, given that communication cost can have a significant effect on system performance as well, it is also desirable to logically tie a thread with the data that it will use so that accesses to the data by the thread are localized whenever possible either in a cache, or if in a NUMA computer, at least within the same node. Otherwise, the communication cost of accessing non-localized data may exceed the benefits of the symmetric distribution of threads.

In most computer architectures, an operating system or kernel, and in particular, program code therein, which is hereinafter referred to as resource allocation manager program code, is responsible for allocating memory and processor resources to application programs and their constituent threads. In a multi-node architecture, for example, typically threads are assigned "home nodes", and the operating system or kernel will attempt to allocate memory and processor resources from a thread's assigned home node to optimize hardware performance, minimize communication costs, and balance workload across the various nodes.

One drawback to conventional resource allocation management schemes, which are implemented entirely within an operating system or kernel, is that the schemes typically allocate hardware resources for application programs in the same manner every time, and irrespective of the types of application programs that are being executed on a computer. This "one size fits all" approach, however, may not result in optimal resource allocation for certain types of application programs.

For example, application programs such as engineering or scientific application programs tend to be highly processor and memory intensive, and require a substantial number of memory accesses during execution. For these types of application programs, it has been found that the amount of memory accesses by the multiple threads executing in such applications necessitates that, whenever possible, all of processor and memory resources utilized by such threads should be highly localized, i.e., for a multi-node computer, should be localized within the same node, or for a single-node computer, should be localized within a limited subset of processor and memory resources. Spreading threads out among a larger set of hardware resources may incur greater communication costs, and degrade overall system performance.

In contrast, application programs such as commercial or interactive application programs, e.g., transaction processing applications, database applications, etc., do not tend to be not as processor and memory intensive as engineering or scientific application programs. Often, a greater concern with such application programs is consistent response time, and as a result, if a local processor or memory resource is not available for a particular thread for an application program, it may be more desirable to allow that thread to utilize other available hardware resources, even if such resources are not local with respect to the hardware resources utilized by other threads for the application program.

Moreover, some application programs may rely on data that is shared with other application programs and/or by multiple threads within the same application program. When such data sharing represents a significant component of application performance, it is often desirable to localize the hardware resources utilized for all of the application programs and/or threads that share the data, and thus maximize the performance of all of such application programs. For application programs that do not share significant data, this concern is not as great.

Given the significant variances in the resource utilization characteristics of different types of application programs, it is difficult to implement a single resource allocation management scheme that optimizes the resource utilization of such application programs. Therefore, a significant need exists for a manner of improving the allocation of hardware resources in a computer that better accounts for the variations in the resource utilization characteristics of different application programs.

SUMMARY OF THE INVENTION

The invention addresses these and other problems associated with the prior art by providing an apparatus, program product and method in which application program-specified resource allocation and allocation strength preferences are used to allocate hardware resources for that application program. The resource allocation preference is used to allocate hardware resources for the application program, while the allocation strength preference is used to determine whether to allocate alternate hardware resources when the resource allocation preference specified by the application program cannot be met.

By permitting an application program to specify both its own resource allocation preference and its own allocation strength preference, the application program is capable of optimizing the manner in which hardware resources will be allocated for that particular program, e.g., by an underlying resource allocation manager of the computer that is resident in the operating system or kernel of the computer. As a result, embodiments consistent with the invention typically enable application programs having different resource utilization characteristics to coexist on the same computer, with the underlying operating environment of the computer able to adapt to the differing resource utilization characteristics of the different application programs.

Consistent with another aspect of the invention, threads may be permitted to inherit at least one of the resource allocation and allocation strength preferences from another existing thread in a computer, e.g., another existing thread in the same application program. In many embodiments, for example, a creator thread that initiates the creation of another thread may specify that the created thread inherits the preferences of the creator thread.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter implement an application-based control of hardware resource allocation in a computer. Such application-based control is typically implemented via the specification of a resource allocation preference and an allocation strength preference to be associated with a particular application program, or alternatively, with particular threads for an application program. Resource allocation and allocation strength preferences may be associated with a particular application program, and apply to all instances, or executions of that program, or alternatively, may be associated with specific instances or executions, thereby permitting different executions of a given application program to effectively operate under different resource allocation schemes.

A resource allocation preference consistent with the invention typically includes sufficient information to permit desired hardware resources to be allocated for an application program. A resource allocation preference may identify, for example, a particular subset of the hardware resources in a computer (referred to as "home" resources). In the alternative, a resource allocation preference may identify a particular allocation scheme to be utilized when allocating hardware resources for the application program (i.e., to determine how the home resources will be selected). One such allocation scheme that may be identified, for example, is a scheme where created threads preferably inherit the same home resources as other, already existing threads in the system (such as the other threads in an application program). Other allocation schemes, however, may be specified consistent with the invention.

An allocation strength preference consistent with the invention is used to determine whether to allocate alternate hardware resources when a resource allocation preference specified by an application program cannot be met. An allocation strength preference may specify a specific allocation strength value, e.g., to permit or prohibit the allocation of alternate hardware resources when a resource allocation preference specified by an application program cannot be met. In the alternative, in some implementations, more than two allocation strength values may be specified, e.g., to define various degrees of allocation strength to be specified by an application program. Also, in some implementations, an allocation strength preference need not specify any particular allocation strength value, and may instead specify a particular scheme, e.g., to enable created threads to inherit the same allocation strength as other, already existing threads in the system (such as the other threads in an application program).

In the illustrated embodiments, the allocation "strength" specified by an allocation strength preference is reflective essentially of how hard an underlying computer operating environment (e.g., the kernel or operating system of a computer) should try to meet the resource allocation preference specified by an application program. It will be appreciated that an application program may also supply additional information to the underlying computer operating environment to assist that environment in allocating hardware resources for an application program. It should also be appreciated that multiple allocation strengths and/or multiple resource allocation preferences may be specified for a given application, e.g., to address different types of resource allocations. As an example, different allocation strengths may be specified for thread dispatching and storage allocation.

In some embodiments, a resource allocation preference or an allocation strength preference may also specify that a kernel or operating system should rely on its own internal algorithms, rather than application-based control.

In many instances, the resource allocation preference and allocation strength preference specified by an application program will be used to localize the hardware resources utilized by the application program. Typically, localized resources will be logically grouped in a manner that provides optimal performance when such resources are used or accessed, as compared with other resources that are not-localized, i.e., that are remote to the localized resources. For a multi-node computer implementation, for example, a set of localized resources may consist of the processors and memory within a given node. In a single-node computer, localized resources may consist of individual processors or components of memory.

It will also be appreciated that a hardware resource consistent with the invention may incorporate any number of types of computer resources, including but not limited to processor resources, memory resources, peripheral resources, and combinations thereof. Moreover, memory resources may include various types of memory devices, including but not limited to main memory, cache memory, registers, mass storage devices, non-volatile memory, and combinations thereof.

In the illustrated embodiments discussed below, a multi-node computer implementation is described. In such embodiments, the resource allocation preference for an application program is typically referred to as a home node preference, indicating that hardware resources disposed in a particular node are preferred for a given application program. Likewise, in such embodiments, the allocation strength preference for an application program is typically referred to as a node strength preference, indicating whether the allocation of a hardware resource from another node should be permitted when a hardware resource disposed in the home node selected using a home node preference is not available. Given that the invention has applicability in other architectures, however, the invention is not limited to a multi-node implementation.

Moreover, in the illustrated embodiments discussed below, the nodes within a multi-node computer each incorporate both processor and memory resources. In other embodiments, however, a node may omit processor or memory resources. Furthermore, in some implementations, the amount and types of resources allocated to different nodes may vary from node-to-node.

Figure 1:
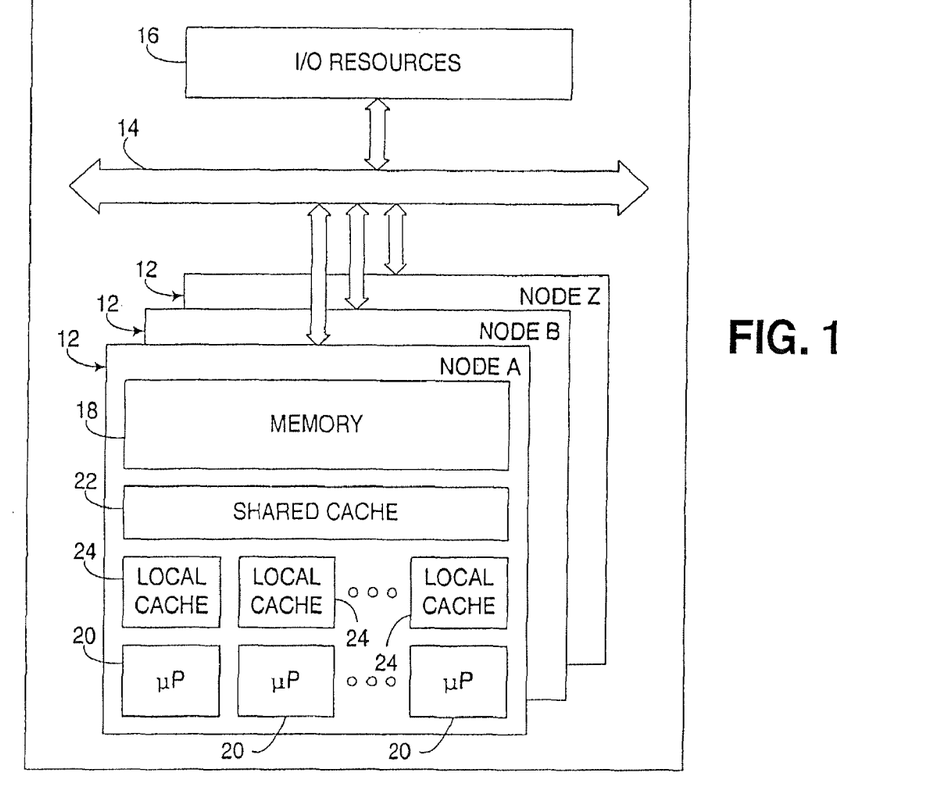
FIG. 1 is a block diagram of the principal hardware components in a computer incorporating application-based control of hardware resource allocation consistent with the invention.

Turning now to the Drawings, wherein like numbers denote like parts throughout the several views, FIG. 1 illustrates the principal hardware components in a computer 10 incorporating application-based control of hardware resource allocation consistent with the invention. Computer 10 generically represents, for example, any of a number of multi-user computers such as a network server, a midrange computer, a mainframe computer, etc., e.g., an AS/400 or eServer iSeries midrange computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes multiple physical subsystems or nodes 12 connected to one another over a system bus 14 or other communications interface, e.g., a fabric. In addition, computer 10 typically includes various I/O resources generically illustrated at 16, including various types of resources such as storage devices, workstations, terminals, networks, imaging devices, etc.

Each node 12 includes a set of hardware resources, e.g., a shared memory 18, one or more microprocessors 20, and one or more levels of cache memory such as a shared cache 22 and one or more local caches 24. The resources 18-24 in each node 12 are characterized by having the ability to interact or communicate more efficiently with one another than when interacting or communicating with the resources in other nodes 12. For example, the resources in each node 12 may be disposed on the same multi-chip module (MCM) or circuit card, whereby the interconnections between such resources may be an order of magnitude or more faster than the interconnects coupled to system bus 14. Other physical partitioning of hardware resources may be utilized in other embodiments of the invention. Moreover, other computer hardware architectures may utilize the application-based control of hardware resource allocation techniques discussed herein. For example, the invention is not limited to multi-node computers, and the techniques discussed herein may be used, e.g., to assign threads to different processors that share a given memory, or otherwise to allocate hardware resources that are not partitioned by node. Therefore, the invention is not limited to the specific hardware implementation illustrated in FIG. 1.

Figure 2:
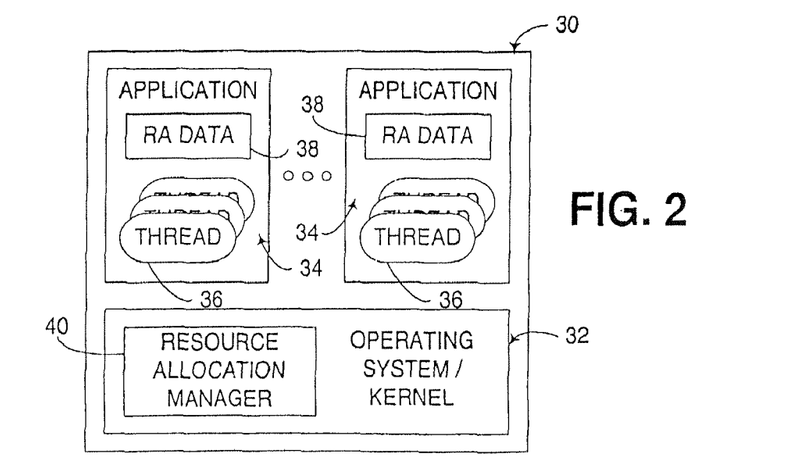
FIG. 2 is a block diagram of the principal software components in the computer of FIG. 1.

FIG. 2 next illustrates an exemplary software architecture 30 capable of being utilized in computer 10 of FIG. 1. As shown, architecture 30 may rely upon an operating system/kernel 32 upon which executes a plurality of application programs 34.

As is shown in FIG. 2, each application program 34 typically executes using one or more threads 36 to perform a variety of tasks. Moreover, consistent with the invention, resource allocation data 38 is defined for each application program 34. The resource allocation data 38 may be represented in a number of manners. For example, resource allocation data may be defined in an application program using one or more variables, constants or other data structures. In the alternative, the resource allocation data may simply be inherently defined by the program code in the application program.

The allocation of hardware resources for each application program 34 is managed by a resource allocation manager 40, which is typically resident within the operating system or kernel 32 of the computer. In the aforementioned eServer iSeries implementation discussed above, for example, resource allocation manager 40 may be resident in the Licensed Internal Code (LIC) of such a computer. It will also be appreciated that the resource allocation management functionality discussed herein may be incorporated into various other logical components in the operating system or kernel of a computer, e.g., in combination with a thread dispatcher, memory manager, etc. The discussion of the herein-described functionality in terms of its implementation within a dedicated resource allocation manager in the operating system or kernel of a computer therefore does not limit the invention solely to such an implementation.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein. As such, the discussion of the herein-described functionality as being implemented within a resource allocation manager does not limit the invention to an implementation within a specific software component of that name.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

One specific implementation of the invention in the environment set forth above in connection with FIGS. 1 and 2 is provided below in connection with FIGS. 3-6. In this implementation, resource allocation data provided by an application program includes a home node preference and a node strength preference, which effectively function as software switches that enable an application program to give advice to a kernel or other entity that manages the allocation of resources within a computer. As will become apparent from the discussion below, the node strength preference affects the kernel dispatching and storage allocation algorithms, while the home node preference is used to effectively override the kernel's home node balancing algorithm. Moreover, these switches also effectively permit an application program to ensure that all threads are maintained on the same node, even if no specific node in the system is preferred.

The implementation discussed hereinafter operates by establishing a home node for a thread during creation of that thread, either using the home node preference specified by the application program, or a default algorithm used by the kernel if no home node preference is specified.

The implementation discussed hereinafter also operates by establishing a node strength for a thread during creation of that thread, either using the home node preference specified by the application program, or a default value such as "weak". A node strength in the implementation may be either "strong" or "weak". When node strength is strong, the kernel will only dispatch threads to processors on their home node (though processors on another node may not be busy), and will only satisfy storage (or memory allocation) requests from the home node (though memory may be available on another node). When node strength is weak, the kernel will still prefer the home node for dispatching and storage requests, but will use other nodes as well, if processors and/or memory are more readily available there.

Under this scheme, an application program that is processor and/or memory intensive (such as an engineering or scientific workload) may operate most efficiently with a strong node strength, whereas a more data intensive application requiring consistent response time (such as an interactive workload) may operate most efficiently with a weak node strength.

Furthermore, an application that has a high degree of application data sharing will typically operate most efficiently when all threads are set to utilize the same home node. In addition, depending on what workloads are running on the system simultaneously, it may be desirable for an application program to specify a home node for each thread, or it may be desirable to allow the kernel to choose the home node for the first thread and have the application program direct the remaining threads to the same node as the first thread.

An application program that does not have a high degree of data sharing, on the other hand, may operate more efficiently by allowing the kernel to choose the home node for each thread in the application program, or the application program may operate more efficiently by explicitly spreading particular threads to particular nodes to isolate the various threads from each other.

It will be appreciated that the selection of optimal resource allocation data for a particular application would be well within the abilities of one of ordinary skill in the art having the benefit of the instant disclosure. Moreover, it will be appreciated that the invention may be utilized in implementations other than that described in connection with FIGS. 3-6. Accordingly, the invention is not limited to the particular implementation discussed hereinafter.

Figures 3, 4:
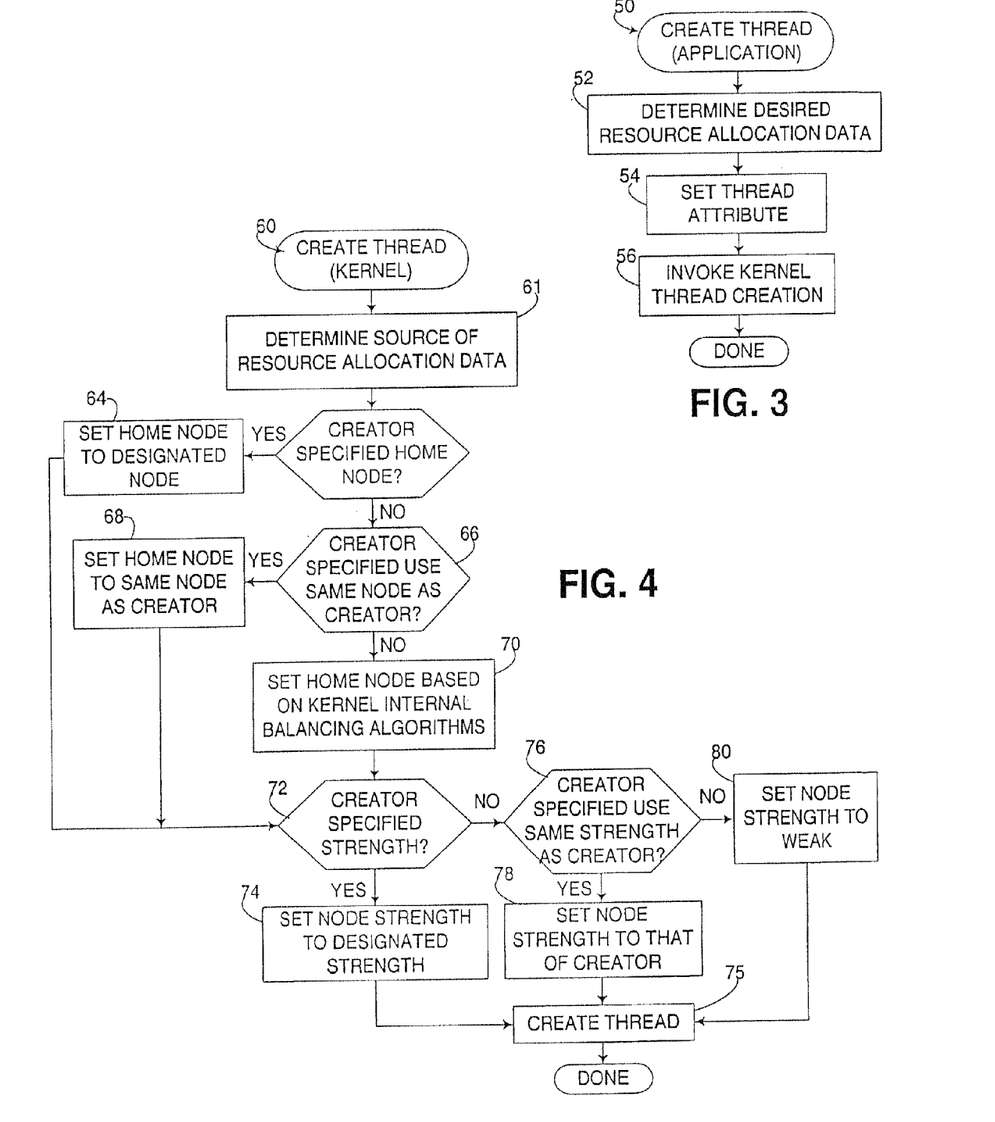
FIG. 3 is a flowchart illustrating the program flow of a create thread routine executed by an application program referenced in FIG. 2.
FIG. 4 is a flowchart illustrating the program flow of a create thread routine executed by the resource allocation manager referenced in FIG. 2.

Now turning to FIGS. 3 and 4, these figures illustrate in greater detail the process associated with creating a thread for an application program, during which resource allocation data, specified by the application program, is used to configure a resource allocation manager in a kernel to appropriately allocate resources for the created thread. In particular, FIG. 3 illustrates a create thread routine 50 that is executed by an application program when a new thread is to be created for that application program, e.g., during the initial execution of the application program, or during the establishment of additional threads for an application program that is currently executing.

Routine 50 begins in block 52 by determining the desired resource allocation data for the application program. As noted above, the resource allocation data may be stored in a data structure and retrieved by the application program, or may be programmatically encoded in the program code for the application program, among other alternatives.

Next, the desired resource allocation data (e.g., in the illustrated implementation, a home node preference and a node strength preference) is specified by the application program to the resource allocation manager in one of a number of different manners. For example, as illustrated by block 54, the resource allocation data may be specified to a resource allocation manager by setting a thread attribute with the desired resource allocation data. In the alternative, the application program may provide the resource allocation data as a parameter in an API call to a thread creation routine in the kernel. As still another alternative, the resource allocation data may be specified to a resource allocation manager by setting a system-wide attribute (e.g., a dedicated address space accessible to the resource allocation manager) with the desired resource allocation data. A system-wide attribute may be set, for example, by the application program during a thread creation operation, or in connection with other operations. A system-wide attribute may also be set externally from an application program in some applications. As such, in embodiments where the resource allocation data is not supplied during thread creation, block 54 may be omitted from routine 50.

Next, block 56 invokes a thread creation routine in the kernel to create the thread for the application program. Once the kernel creates the new thread, control returns to routine 50, and the routine is complete.

FIG. 4 illustrates a create thread routine 60 that is executed in the kernel of computer 10 (e.g., within resource allocation manager 40) in response to an appropriate call by an application program. In routine 60, it is assumed that the application program, or a specific thread in the application program that initiated the create thread routine (collectively referred to as a "creator"), has provided one or both of a home node preference and a node strength preference (or optionally, neither, whereby all allocation decisions would be left to the resource allocation manager). Alternatively, these preferences may have been provided as a result of setting a system-wide attribute. Moreover, it is assumed that a home node preference, when provided, may specify either a specific home node, or an "inherit" designation, which may be used to set the home node for the new thread to that of its creator. In addition, it is assumed that a node strength preference, when provided, may specify either a specific strength value, or an "inherit" designation, which may be used to set the node strength for the new thread to that of its creator. Moreover, in this embodiment, a node strength may have one of two values, "strong" and "weak", whereby a "strong" node strength prohibits the allocation of resources on a node other than a thread's home node when no suitable resources are available, while a "weak" node strength permits such alternate allocation.

Routine 60 begins in block 61 by first determining the source of the resource allocation data, e.g., to determine whether the home node preference and node strength preference have each been specified via a thread attribute, a system-wide attribute, or neither. Block 62 next determines whether a specific home node has been specified by the creator of the new thread. If a specific home node has been provided, control passes to block 64 to set the home node for the new thread to the designated node. Otherwise, block 62 passes control to block 66 to determine whether the creator specified that the home node of the new thread should be inherited from (i.e., the same as) that of the creator. If so, control passes to block 68 to set the home node for the new thread to that of its creator. Otherwise, block 66 passes control to block 70 to set the home node for the thread in a conventional manner, e.g., based upon an internal balancing algorithm in the kernel.

Irrespective of what home node is selected for the new thread, control then passes to block 72 to set a node strength for the thread. Block 72, in particular, determines whether a particular node strength value has been provided by the creator. If so, control passes to block 74 to set the node strength to the designated strength value, whereby control then passes to block 75 to create the thread, in a manner well known in the art, and using the home node and/or node strength set for the thread to determine the node within which the thread will be created. Routine 60 is then complete.

Returning to block 72, if a node strength value is not specified, control passes to block 76 to determine whether the creator specified that the node strength of the new thread should be inherited from (i.e., the same as) that of the creator. If so, control passes to block 78 to set the node strength for the new thread to that of its creator, and then to block 75 to create the thread, whereby routine 60 is then complete. Otherwise, block 76 passes control to block 80 to set the node strength for the thread to "weak." Control passes to block 75 to create the thread, and routine 60 is then complete. Also, as an alternative to setting a "weak" node strength in the absence of a specified node strength preference, block 80 may set a strength value for the thread based upon an internal balancing algorithm in the kernel.

Figure 5:
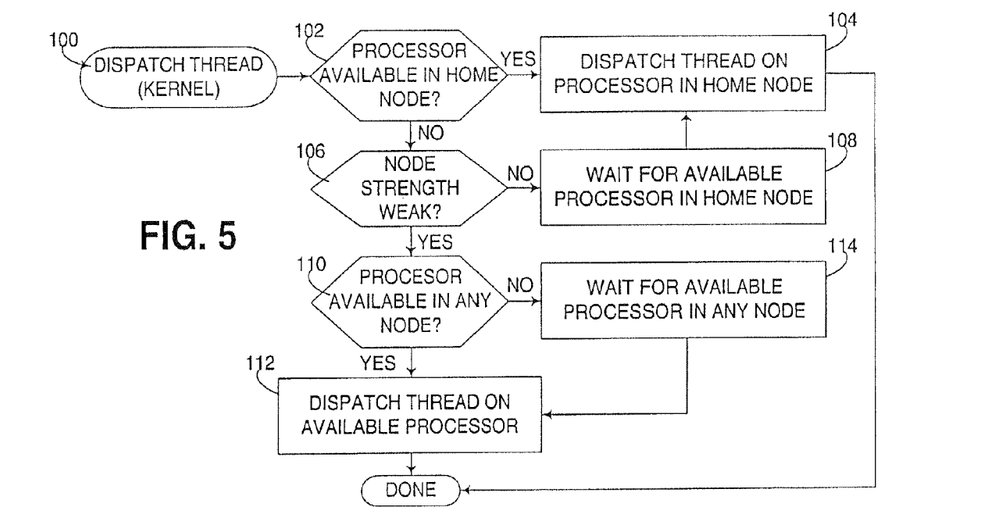
FIG. 5 is a flowchart illustrating the program flow of a dispatch thread routine executed by the resource allocation manager referenced in FIG. 2.

Once the home node and node strength are established for a thread, resource allocation determinations are thereafter made by the kernel, and in particular, by the resource allocation manager, using such parameters. FIG. 5, for example, illustrates a dispatch thread routine 100 that may be executed by the kernel whenever it is desirable to dispatch a thread to a particular processor resource for execution thereby. Routine 100 begins in block 102 by determining first whether a processor is available in the home node for the thread.

If so, control passes to block 104 to dispatch the thread on the available processor in the home node, and routine 100 is complete. Otherwise, block 102 passes control to block 106 to determine whether the node strength for the thread is set to "weak". If not, control passes to block 108 to wait for an available processor in the home node, such that, when a processor does become available, the thread is dispatched to that processor, and routine 100 is complete.

Returning to block 106, if the node strength is set to "weak", control passes to block 110 to determine whether any other processor (i.e., a processor on a node other than the home node) is available to handle the thread. If so, control passes to block 112 to dispatch the thread on that available processor, and routine 100 is complete. Otherwise, block 110 passes control to block 114 to wait for an available processor in any node (i.e., the home node or otherwise) in the system, such that, when a processor does become available, the thread is dispatched to that processor, and routine 100 is complete.

Figure 6:
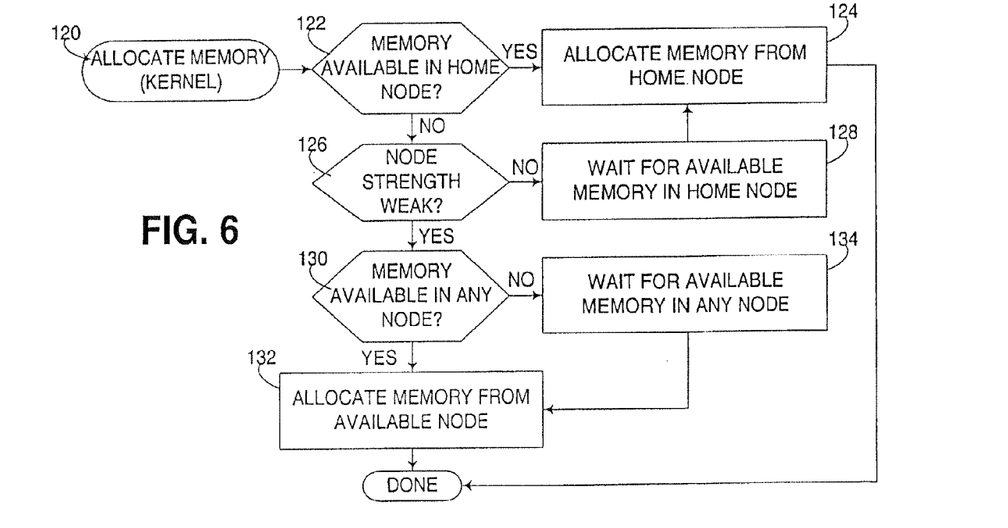
FIG. 6 is a flowchart illustrating the program flow of an allocate memory thread routine executed by the resource allocation manager referenced in FIG. 2.

As another example, FIG. 6 illustrates an allocate memory routine 120 that may be executed by the kernel whenever it is desirable to allocate additional memory for the application program or a thread therein. Routine 120 begins in block 122 by determining first whether suitable memory is available in the home node for the thread.

If so, control passes to block 124 to allocate the desired memory from the home node, and routine 120 is complete. Otherwise, block 122 passes control to block 126 to determine whether the node strength for the thread is set to "weak". If not, control passes to block 128 to wait for available memory in the home node, such that, when suitable memory does become available, that memory is allocated from the home node. Routine 120 is then complete.

Returning to block 126, if the node strength is set to "weak", control passes to block 130 to determine whether any memory is available in another node (i.e., in a node other than the home node). If so, control passes to block 132 to allocate suitable memory from that other node, and routine 120 is complete. Otherwise, block 130 passes control to block 134 to wait for memory to become available in any node (i.e., the home node or otherwise) in the system, such that, when the memory does become available, the memory will be allocated. Routine 120 is then complete.

It will be appreciated that resource allocation data specified by an application program may be used to allocate resources for an application program other than the processor and memory resources described in connection with FIGS. 5 and 6. The invention is therefore not limited to these specific types of hardware resources.

Various additional modifications will be apparent to one of ordinary skill in the art having the benefit of the instant disclosure. For example, in some embodiments, it may be desirable to support the ability to inherit resource allocation and/or allocation strength preferences from threads other than a creator thread, e.g., so inheritance may be based upon a designated reference thread. In addition, preferences may also be initially designated and/or modified separate from the process of creating a thread, e.g., to change how resources are allocated for a thread at some point in time after the thread has been created.

Furthermore, as noted above, it may be desirable to have greater strength granularity. As an example, different strength values could be used to enable a thread dispatch, or a storage allocation request, to wait only on a home node, or to wait on all nodes, whenever forced to wait for an available processor or memory.

Other modifications may be made without departing from the spirit and scope of the invention. Therefore, the invention lies in the claims hereinafter appended.

What is claimed is:

1. An apparatus, comprising:
   a computer having a Non-Uniform Memory Access (NUMA) architecture and including a plurality of hardware resources distributed among a plurality of nodes, wherein each node includes processor and memory hardware resources, and wherein the processor hardware resources in each node have shorter access times when accessing the memory hardware resources located in the same node than when accessing the memory hardware resources in other nodes; and
   program code resident in the computer and configured to use a resource allocation preference and an allocation strength preference for an application program to allocate a selected hardware resource for the application program, wherein the resource allocation preference and the allocation strength preference are specified by the application program, wherein the resource allocation preference is used to allocate hardware resources for the application program, wherein the allocation strength preference is used to determine whether to allocate alternate hardware resources when the resource allocation preference specified by the application program cannot be met, wherein the resource allocation preference includes a home node preference for the application program, wherein the allocation strength preference includes a node strength preference for use in determining whether to allocate hardware resources from another node when a hardware resource disposed in a home node selected using the home node preference is not available, wherein the program code is configured to allocate the selected hardware resource for the application program by allocating memory for the application program from a memory hardware resource disposed in a selected node among the plurality of nodes, wherein the node strength preference comprises a first node strength preference for use in determining whether to allocate a processor hardware resource from another node when a processor hardware resource disposed in a home node selected using the home node preference is not available, and wherein the allocation strength preference further includes a second node strength preference for use in determining whether to allocate a memory hardware resource from another node when a memory hardware resource disposed in a home node selected using the home node preference is not available, and wherein the first node strength preference differs from the second node strength preference.

2. The apparatus of claim 1, wherein the program code includes a resource allocation manager resident in at least one of an operating system and a kernel for the computer.

3. The apparatus of claim 1, wherein the program code is configured to allocate the selected hardware resource for the application program by dispatching a thread for the application program to a processor hardware resource disposed in a selected node among the plurality of nodes.

4. The apparatus of claim 1, wherein each node includes a plurality of processors, and wherein the program code is configured to allocate the selected hardware resource for the application by dispatching a thread to any of the plurality of processors in the home node specified by the home node preference.

5. The apparatus of claim 1, wherein the home node preference identifies a selected node among the plurality of nodes.

6. The apparatus of claim 1, wherein the home node preference identifies that a created thread should inherit the home node of another thread.

7. The apparatus of claim 1, wherein the node strength preference is selected from first and second values, the first value permitting the allocation of a hardware resource from another node when a hardware resource disposed in the home node selected using the home node preference is not available, and the second value prohibiting the allocation of a hardware resource from another node when a hardware resource disposed in the home node selected using the home node preference is not available.

8. The apparatus of claim 1, wherein the node strength preference is selected from among more than two relative node strength values.

9. The apparatus of claim 1, wherein the node strength preference identifies that a created thread should inherit the node strength of another thread.

10. The apparatus of claim 1, wherein the program code is configured to use the resource allocation preference and allocation strength preference to allocate the selected hardware resource for the application program in response to a request to create the thread.

11. The apparatus of claim 1, wherein the program code is configured to access a thread attribute for the thread to obtain the allocation strength preference.

12. The apparatus of claim 1, wherein the program code is configured to access a system-wide attribute to obtain the allocation strength preference.

13. An apparatus, comprising:
a computer having a Non-Uniform Memory Access (NUMA) architecture and including a plurality of hardware resources distributed among a plurality of nodes, wherein each node includes processor and memory hardware resources, and wherein the processor hardware resources in each node have shorter access times when accessing the memory hardware resources located in the same node than when accessing the memory hardware resources in other nodes; and
program code resident in the computer and configured to use a resource allocation preference and an allocation strength preference for an application program to allocate a selected hardware resource for the application program, wherein the resource allocation preference and the allocation strength preference are specified by the application program, wherein the resource allocation preference is used to allocate hardware resources for the application program, wherein the allocation strength preference is used to determine whether to allocate alternate hardware resources when the resource allocation preference specified by the application program cannot be met, wherein the resource allocation preference includes a home node preference for the application program, wherein the allocation strength preference includes a node strength preference for use in determining whether to allocate hardware resources from another node when a hardware resource disposed in a home node selected using the home node preference is not available, and wherein the program code is configured to allocate the selected hardware resource for the application program by allocating memory for the application program from a memory hardware resource disposed in a selected node among the plurality of nodes, and wherein at least one of the resource allocation preference and allocation strength preference for the application program differs for processor and memory hardware resources.

* * * * *